US012752836B2

(12) United States Patent
Moretti et al.

(10) Patent No.: US 12,752,836 B2
(45) Date of Patent: Oct. 6, 2026

(54) METHOD FOR SECURING A SETPOINT TORQUE FOR A MOTOR OF A POWER STEERING SYSTEM

(71) Applicant: JTEKT EUROPE, Irigny (FR)

(72) Inventors: Romain Moretti, Thurins (FR); Julien Ponte, Lyons (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 0 days.

(21) Appl. No.: 18/973,675

(22) Filed: Dec. 9, 2024

(65) Prior Publication Data

US 2025/0196913 A1 Jun. 19, 2025

(30) Foreign Application Priority Data

Dec. 13, 2023 (FR) ..................................... 23/14091

(51) Int. Cl.
*B62D 5/04* (2006.01)

(52) U.S. Cl.
CPC .................................... *B62D 5/046* (2013.01)

(58) Field of Classification Search
CPC ........ B62D 5/046; B62D 6/002; B62D 6/001; B62D 15/025; B62D 5/04
See application file for complete search history.

(56) References Cited

U.S. PATENT DOCUMENTS 4,757,869 A * 7/1988 Morishita ............ B62D 5/0478 701/41
6,095,277 A * 8/2000 Bohner .................. B62D 6/001 180/403
6,473,678 B1 * 10/2002 Satoh ................... G05D 1/0246 340/439
8,078,361 B2 * 12/2011 Galkowski ............. B62D 6/003 701/41
9,499,196 B2 * 11/2016 Kariatsumari ........... B62D 6/10
2005/0125153 A1 * 6/2005 Matsumoto .............. B62D 1/28 701/41
2005/0189163 A1 * 9/2005 Barton .................. B60T 8/1764 180/446

(Continued)

FOREIGN PATENT DOCUMENTS

DE 102008033687 A1 1/2010

OTHER PUBLICATIONS

Jun. 24, 2024 Written Opinion issued in French Patent Application No. 2314091.

*Primary Examiner* — Lindsay M Low
*Assistant Examiner* — Brian R Kirby
(74) *Attorney, Agent, or Firm* — Oliff PLC

(57) ABSTRACT

A method for securing a setpoint torque for a motor exerting a motor torque on a device of a power steering system, and including: a first determination step in which a first intermediate value of the setpoint torque is determined; a second determination step in which a limit value of the first intermediate value of the setpoint torque is determined; a third determination step in which a parameter representative of the average motor torque exerted at a previous instant is determined; and securing step in which a target value of the setpoint torque is determined based on the first intermediate value, the limit value and the parameter representing the average motor torque exerted at the previous instant.

9 Claims, 5 Drawing Sheets

(56) References Cited

U.S. PATENT DOCUMENTS

| | | | | |
|---|---|---|---|---|
| 2005/0216155 | A1* | 9/2005 | Kato | B62D 5/008 180/408 |
| 2006/0037806 | A1* | 2/2006 | Kasahara | B62D 6/008 180/402 |
| 2009/0240389 | A1* | 9/2009 | Nomura | H02P 6/16 701/41 |
| 2010/0198462 | A1* | 8/2010 | Shinoda | H02P 21/02 318/560 |
| 2014/0265953 | A1* | 9/2014 | Collier-Hallman | B62D 5/0481 318/400.02 |
| 2015/0344065 | A1* | 12/2015 | Lee | B62D 6/10 701/41 |
| 2017/0088166 | A1* | 3/2017 | Kunihiro | B62D 6/002 |
| 2017/0349208 | A1* | 12/2017 | Sugawara | B62D 5/0463 |
| 2019/0351936 | A1* | 11/2019 | Anraku | B62D 6/08 |
| 2020/0062297 | A1* | 2/2020 | Tsuchimoto | H02P 6/182 |
| 2022/0063719 | A1* | 3/2022 | Won | B62D 6/002 |
| 2023/0192180 | A1 | 6/2023 | Michelis et al. | |

* cited by examiner

[Fig. 1]
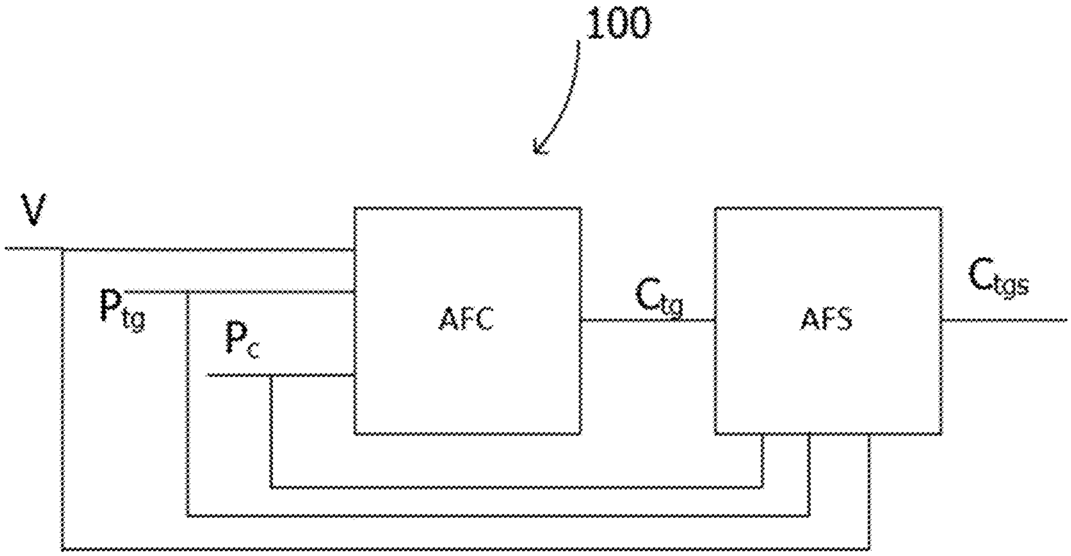

[Fig. 2]
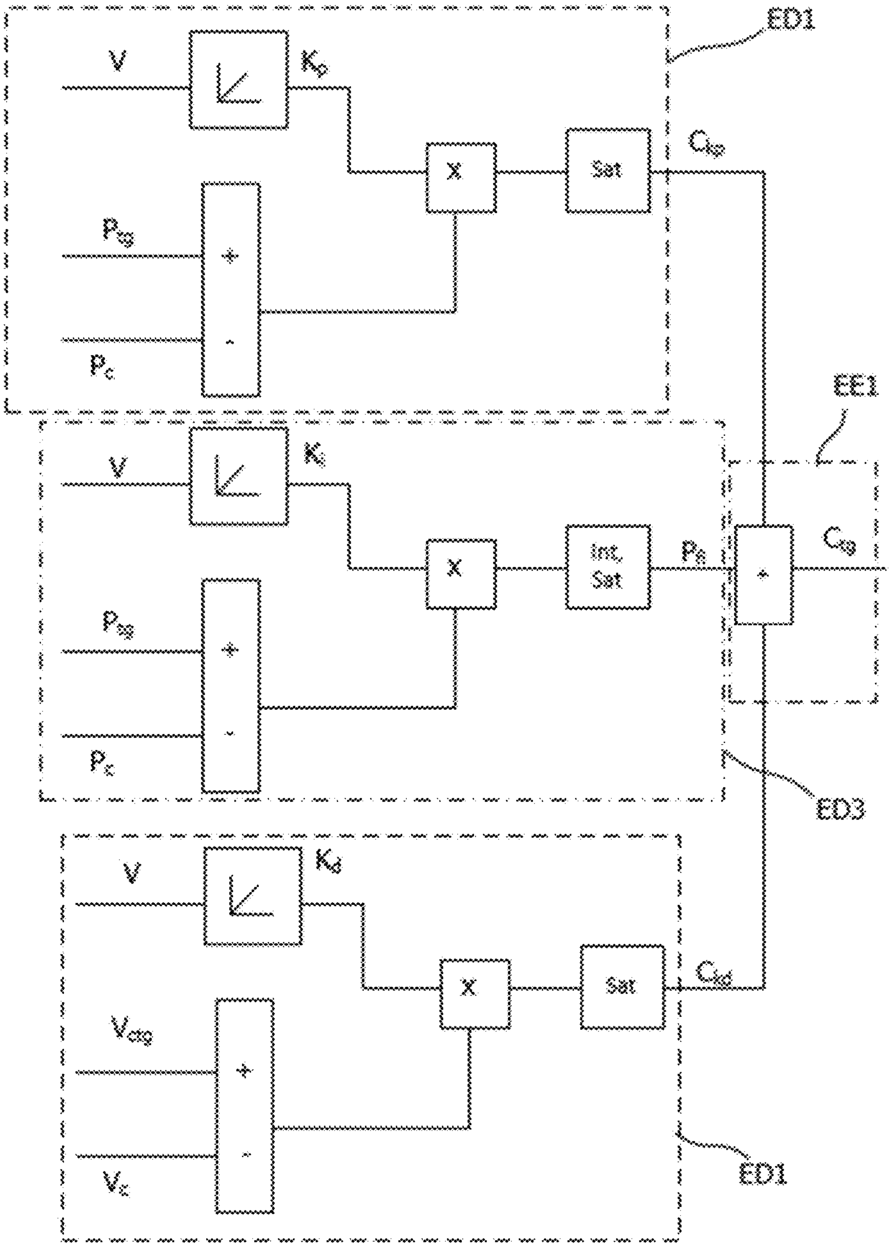

[Fig. 3]
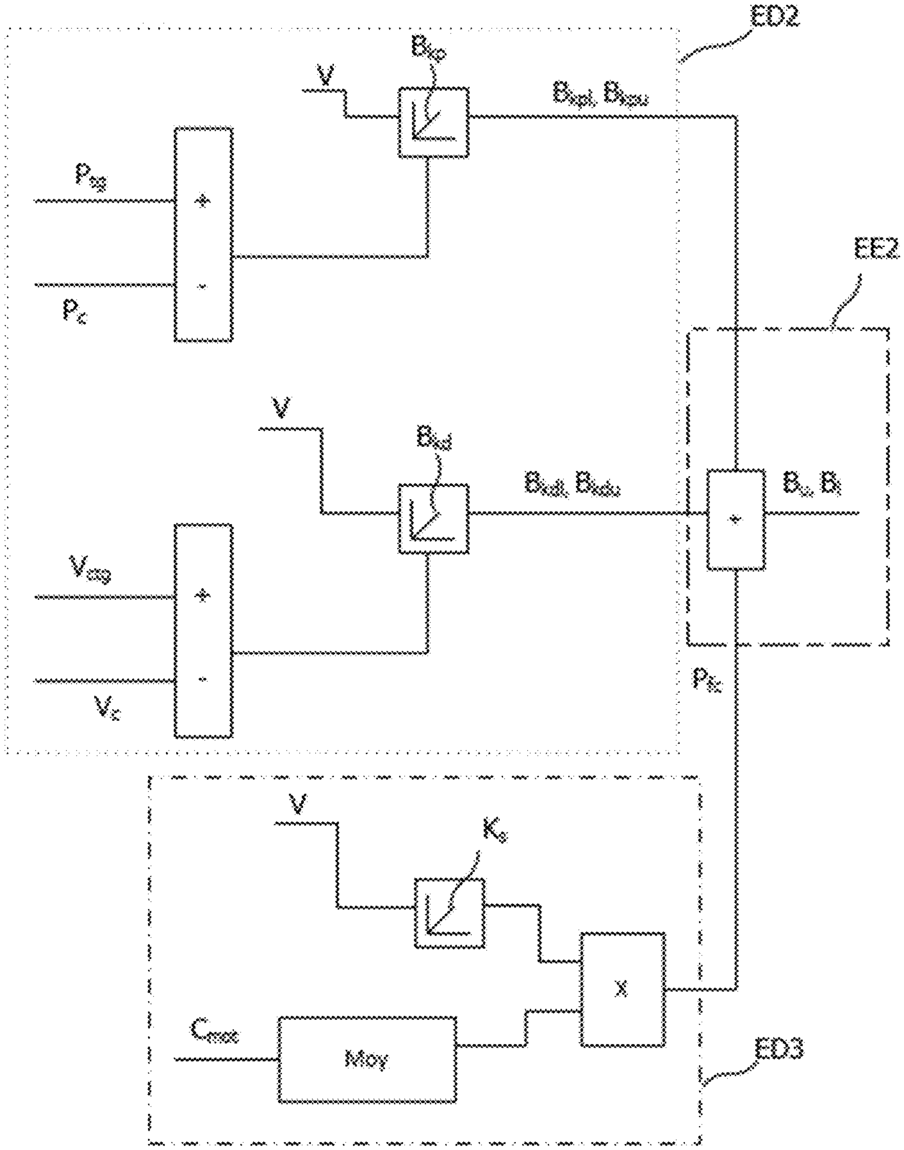

[Fig. 4]
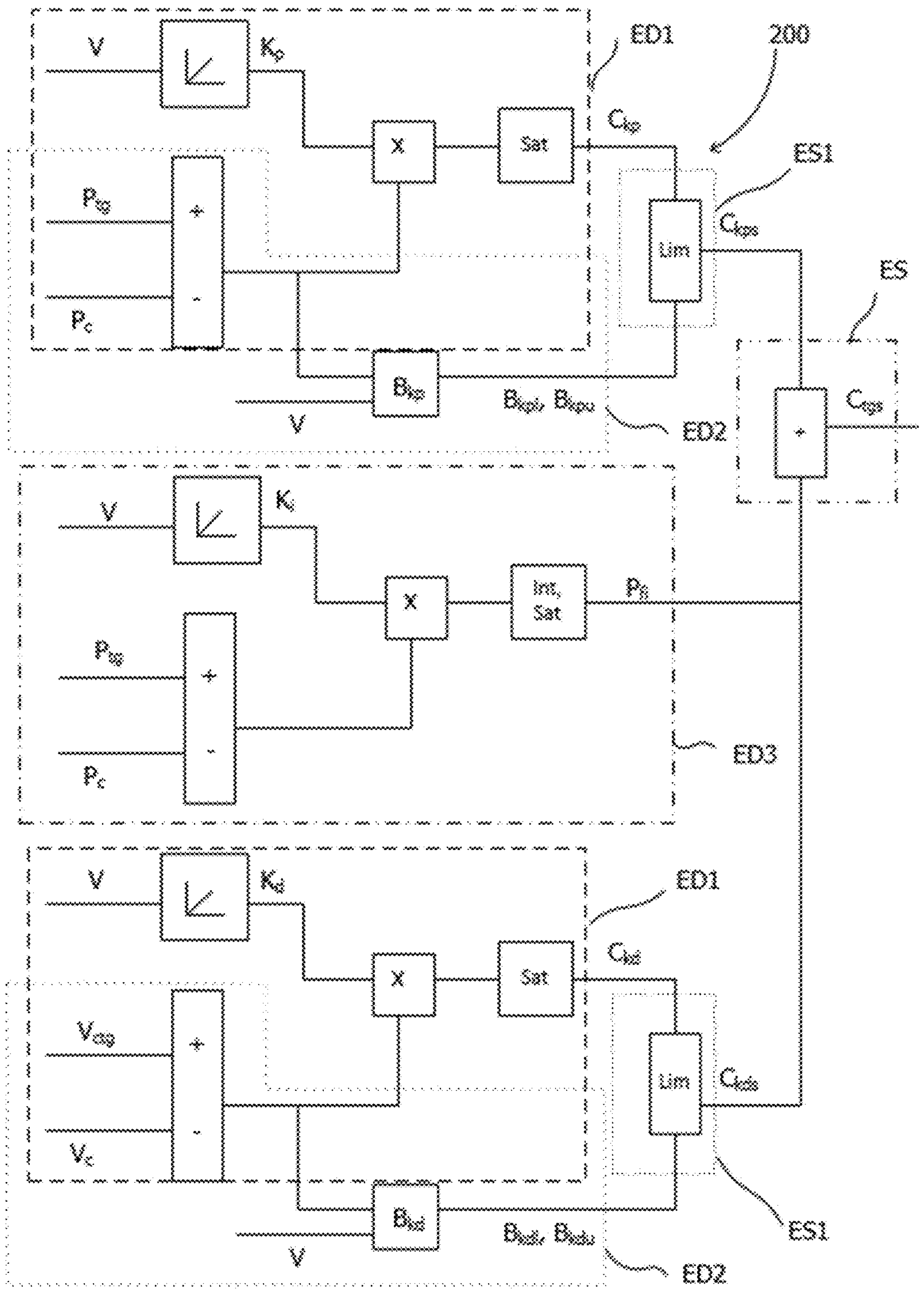

[Fig. 5]
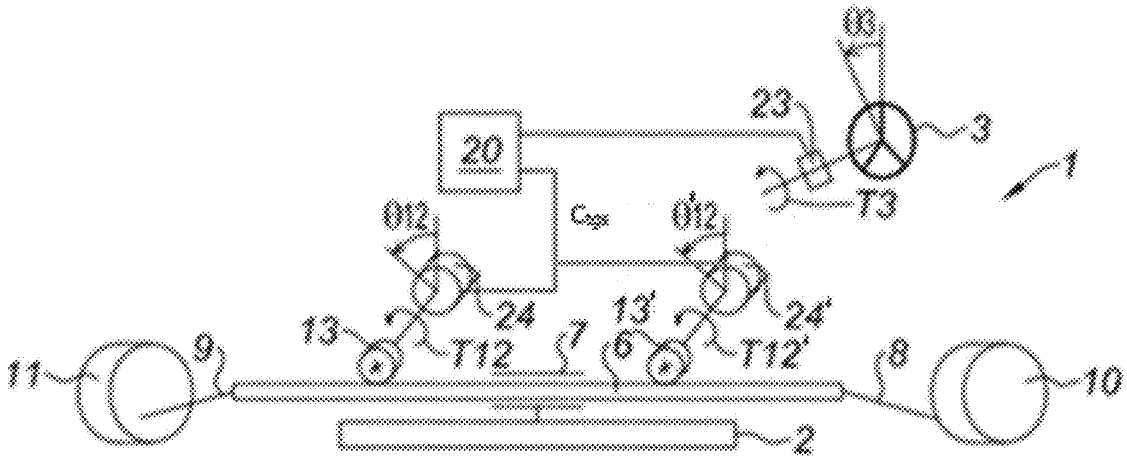

METHOD FOR SECURING A SETPOINT TORQUE FOR A MOTOR OF A POWER STEERING SYSTEM

TECHNICAL FIELD

The invention concerns the field of vehicles comprising a power steering system and more particularly a method for securing a setpoint torque for a motor.

PRIOR ART

A steering system of a vehicle has the purpose of allowing a driver to control a trajectory of the vehicle by modifying an orientation angle of the wheels of the vehicle by means of a steering wheel. The driver modifies an angle of the steering wheel by exerting a force on it.

Generally, a steering system comprises several elements whose said steering wheel, a rack, and two wheels each connected to a connecting rod. The rack is the part allowing the wheels to be maneuvered, that is to say allowing to modify the orientation angle of the wheels, via the connecting rods. An angular position of the rack relative to a steering casing, hereinafter called the rack angular position, is an image of the orientation angle of the wheels.

In an electric power steering system without mechanical connection, called «steer-by-wire», the steering wheel is mechanically detached from the rack. In this case, the steering system comprises a steering wheel unit mechanically independent of a rack unit. In other words, a force applied to the steering wheel unit is not mechanically transmitted to the rack unit, and vice versa.

The steering wheel unit comprises said steering wheel and at least one means of estimating the angle of the steering wheel, for example an angle sensor.

The rack unit comprises said rack movable in the steering casing, and at least one electronic control unit which in particular controls the angular position of the rack so that it is consistent with a setpoint angular position. The setpoint angular position is generally consistent with the steering wheel angle, but it can be modified by vehicle functions such as a trajectory tracking function or a vehicle parking assistance function.

The electronic control unit determines a setpoint motor torque, or setpoint torque in the remainder of the description, to control at least one motor that exerts a motor torque on the rack. In other words, the controller servo-controls the angular position of the rack at the setpoint angular position by determining the setpoint torque of the motor.

Securing the proper operation of the controller and more particularly the control in the position of the rack allowing to be ensured of a consistency between the setpoint angular position and the rack angular position is important in order to guarantee a safety of the vehicle.

There is a known solution allowing a detection of a malfunction of the rack unit. The malfunction of the rack unit is defined as a difference between the rack angular position and the setpoint angular position. When a malfunction is detected, the servo-control is then performed by a backup controller.

The disadvantage of this solution is that it does not discriminate an origin of the malfunction. Thus, it is not possible to determine whether the difference between the rack angular position and the setpoint angular position is due to a controller failure or to another cause such as wheel block, for example.

There is therefore a need for more efficient securing of the controller.

DISCLOSURE OF THE INVENTION

An embodiment concerns a method for securing a setpoint torque for an motor, said motor exerting a motor torque on a device of a power steering system of a vehicle so as to modify an angular position of said device, the method being executed by at least one controller and comprising:

- A first determination step in which at least one first intermediate value of the setpoint torque is determined as a function of at least one parameter representative of a setpoint angular position of the device and at least one parameter representative of the angular position of the device;
- A second determination step in which a limit value of the at least one first intermediate value of the setpoint torque is determined as a function of at least the parameter representative of the setpoint angular position and at least the parameter representative of the angular position;
- A third determination step in which a parameter representative of the average motor torque exerted at a previous instant is determined;
- A securing step in which a target value of the setpoint torque is determined as a function of at least the first intermediate value of the setpoint torque, the limit value of the first intermediate value of the setpoint torque and the parameter representative of the average motor torque exerted at the previous instant.

The controller may be an electronic control unit.

The setpoint torque designates any quantity representative of the setpoint torque making it possible to control the torque of the motor.

In some embodiments, the device on which the motor exerts the motor torque is a rack of the power steering system of a vehicle.

In some embodiments, the power steering system is of the type without mechanical link.

The first step determines at least one first intermediate value of the setpoint torque. In other words, the setpoint torque can be determined, in some embodiments, as a function of several intermediate values.

The first intermediate value is determined as a function of at least the parameter representative of the target angular position of the device and at least the parameter representative of the angular position of the device. The parameter representative of the target angular position or the parameter representative of the angular position can be an angle, a position of the device relative to a point of the motor, or an angular position of the motor. The parameter representative of the angular position can be determined, estimated or measured.

In some embodiments, the first intermediate value is obtained in particular by calculating the difference of the parameter representative of the target angular position and the parameter representative of the angular position, then by multiplying the difference by a first gain. The first gain is subsequently referred to as the «proportional gain».

In some embodiments, the first intermediate value is obtained by a saturation of the implementation of the product of the difference by the proportional gain. Thus, there is no «overflow» of the first intermediate value, that is to say the first intermediate value is limited.

In some embodiments, the first determination step also determines the at least one first intermediate value of the setpoint torque as a function of the speed of the vehicle.

More specifically, the proportional gain may depend on the speed of the vehicle.

Thus, the proportional gain modifies a speed with which the wheels of the vehicle will follow the setpoint angular position. At the vehicle level, this modifies a precision with which the driver can control a wheel orientation angle. By reducing the proportional gain, this precision decreases but driving comfort is increased because it filters out higher frequency wheel orientation movements.

It is common for vehicles to be equipped with a rack with a variable ratio depending on the vehicle speed between the setpoint angular position and the wheel orientation angle. In other words, at 20 km/h, the rack ratio is substantially direct, that is to say the wheel orientation angle varies substantially proportionally to the setpoint angular position, because the vehicle's trajectory evolves slowly. At high speed, the rack ratio is not very direct, that is to say the wheel orientation angle varies less than the setpoint angular position, because the slightest variation in the wheel orientation angle causes the car to deviate/shake significantly.

According to an embodiment, the proportional gain increases with the vehicle speed.

Thus, at 20 km/h, the proportional gain is reduced so as to degrade the steering precision of the wheel orientation angle but to improve driving comfort, for example in the case of rapid variations in the setpoint angular position, that is to say if the driver oscillates the steering wheel.

At high speed, for example 130 km/h, the rack ratio is not very direct, so it is important to maintain good precision and therefore a significant proportional gain.

The second step determines the limit value of the at least one first intermediate value of the setpoint torque. When several intermediate values are determined, the second step determines several limit values. In other words, for each intermediate value determined by the first determination step, the second determination step determines a limit value.

In some embodiments, the limit value is obtained in particular by calculating the difference between the parameter representing the setpoint angular position and the parameter representing the angular position, then by multiplying the difference by a first limit gain. The first limit gain is subsequently referred to as the «limit proportional gain».

The limit value may be a pair of limit values comprising an upper limit value and a lower limit value. Alternatively, only one of the upper limit value or the lower limit value may be determined, and the other of the upper or lower limit value is calculated by symmetry.

In some embodiments, the second determination step determines the limit value of the at least one first intermediate value of the setpoint torque as a function of the vehicle speed.

More specifically, the limit proportional gain may depend on the vehicle speed.

The third step determines the parameter representative of the average motor torque exerted at the previous instant.

The term «previous instant» means a moment located in the past relative to the calculation of the target value of the current setpoint torque. The previous instant depends in particular on a speed at which the securing method is carried out.

Finally, the securing step combines the at least one first intermediate value of the setpoint torque, the limit value of the at least one first intermediate value of the setpoint torque and the parameter representing the average motor torque exerted at the previous instant so as to determine the target value of the setpoint torque.

The parameter representing the average motor torque can be obtained in various ways, such as by a low-pass filter. Using the parameter representing the average motor torque makes it possible to ignore rapid changes in the motor torque.

The target value of the setpoint torque is the torque value that we want the motor to exert on the device. This is a secure setpoint torque. In other words, the securing step makes it possible to guarantee that the requested setpoint torque, corresponding to the target value of the setpoint torque, is comprised in a defined interval around the parameter representing the average motor torque exerted at a previous instant. In other words, there is a framework for the target value of the setpoint torque. There can therefore be no significant and sudden deviation from the requested setpoint torque. Thus, errors related to a malfunction of the controller implementing at least the first step are avoided or the effects of a failure are limited without switching to another regulation strategy such as a back-up law, or another controller.

In certain embodiments, the parameter representing the average motor torque exerted at the previous instant is determined as a function of at least the parameter representing the setpoint angular position and at least the parameter representing the angular position of the device.

One of the ways to determine the parameter representing the average motor torque is to use at least the parameter representing the setpoint angular position and at least the parameter representing the angular position of the device.

In some embodiments, the parameter representing the average motor torque is obtained in particular by calculating the difference between the parameter representing the setpoint angular position and the parameter representing the angular position, then by multiplying the difference by a gain subsequently referred to as the «integral gain».

In some embodiments, the parameter representing the average motor torque is obtained by an implementation saturation and an integration of the product of the difference by the integral gain. Thus, there is no «overflow» of the parameter representing the average motor torque, that is to say the parameter representing the average motor torque is limited.

In some embodiments, the parameter representing the average motor torque is determined at least as a function of the vehicle speed.

More specifically, the integral gain may depend on the vehicle speed.

In some embodiments, the parameter representative of the average motor torque exerted at the previous instant is determined as a function of the target value of the setpoint torque at the previous instant or as a function of a measurement of a parameter representative of the motor torque exerted at the previous instant.

The measurement of the exerted motor torque can be carried out directly or indirectly on the device or on the motor.

In some embodiments, the parameter representative of the average motor torque exerted at the previous instant is determined by applying a low-pass filter to the target value of the setpoint torque at the previous instant or to the measurement of the parameter representative of the motor torque exerted at the previous instant.

In some embodiments, the low-pass filter is of the $2^{nd}$ order.

Thus, a static part of the exerted motor torque is obtained, that is to say that rapid variations in the exerted motor torque are eliminated. The low-pass filter makes it possible to obtain a sort of «average» motor torque.

In some embodiments, the parameter representative of the average motor torque exerted at the previous instant is obtained by multiplying the filtered target value of the setpoint torque at the previous instant or the filtered measurement of the parameter representative of the motor torque exerted at the previous instant, with a gain subsequently referred to as <static gain>.

In some embodiments, the static gain depends on the vehicle speed.

In some embodiments, the securing method comprises:

a first evaluation step in which a temporary value of the setpoint torque is evaluated as a function of the at least one first intermediate value of the setpoint torque and the parameter representative of the average motor torque exerted at the previous instant, and a second evaluation step in which a limit value of the temporary value of the setpoint torque is determined as a function of the limit value of the at least one first intermediate value of the setpoint torque and the parameter representative of the average motor torque exerted at the previous instant;

the securing step determining the target value of the setpoint torque as a function of at least the temporary value of the setpoint torque and the limit value of the temporary value of the setpoint torque.

For example, the first evaluation step sums the at least one first intermediate value of the setpoint torque and the parameter representing the average motor torque exerted at the previous instant. In other words, if several intermediate values are determined, the first evaluation step sums the plurality of intermediate values of the setpoint torque and the parameter representing the average motor torque exerted at the previous instant.

For example, the second evaluation step sums the limit value of the first intermediate value of the setpoint torque and the parameter representing the average motor torque exerted at the previous instant. In other words, if several intermediate values are determined, therefore if several limit values are determined, the second evaluation step sums the plurality of limit values and the parameter representing the average motor torque exerted at the previous instant.

The securing step then performs a limitation of the temporary value of the setpoint torque by the limit value of the temporary value of the setpoint torque so that the temporary value of the setpoint torque is comprised in the limit value of the temporary value.

In some embodiments, the first determination step, the third determination step and the first evaluation step are performed by a position controller of the device, and the second determination step, the third determination step, the second evaluation step and the securing step are performed by a securing controller receiving in particular as input the temporary value of the setpoint torque of the position controller.

Thus the securing controller is positioned independently and after the position controller. It is therefore possible on the one hand to make modifications or adjustments to the position controller independently of the securing controller and on the other hand to position the securing controller in a partition of an electronic control unit that is more robust to failures than that of the position controller. Securing the setpoint torque of the motor is therefore ensured.

In some embodiments, the method comprises:

A first securing step in which at least one target value of the at least one first intermediate value of the setpoint torque is determined as a function of the at least one first intermediate value of the setpoint torque and the limit value of the at least one first intermediate value of the setpoint torque;

the securing step determining the target value of the setpoint torque as a function of at least the target value of the at least one first intermediate value of the setpoint torque and the parameter representative of the average motor torque exerted at the previous instant.

The first securing step consists, for example, of limiting the at least one first intermediate value of the setpoint torque by the limit value of the at least one first intermediate value of the setpoint torque. Thus, the target value of the at least one first intermediate value of the setpoint torque is at most or at least equal to the limit value of the at least one first intermediate value of the setpoint torque.

In the case where several intermediate values are determined, each intermediate value is limited by the appropriate limit value.

The securing step determines the target value of the setpoint torque as a function of at least the target value of the at least one first intermediate value of the setpoint torque and the parameter representing the average motor torque exerted at the previous instant.

For example, the target value of the setpoint torque is obtained by the sum of the at least one target value of the at least one first intermediate value of the setpoint torque and the parameter representing the average motor torque exerted at the previous instant. In the case where several target values of several intermediate values have been determined, the target value of the setpoint torque is obtained by the sum of all the target values of the intermediate values and the parameter representing the average motor torque exerted at the previous instant.

In some embodiments, the first determination step also determines a second intermediate value of the setpoint torque as a function of at least one parameter representing a target speed of said device and a parameter representing a speed of said device, and the second determination step also determines a limit value of the second intermediate value of the setpoint torque as a function of at least the parameter representative of the target speed of said device and the parameter representative of the speed of said device.

The parameter representing the setpoint speed of said device or the parameter representing the speed of said device may be determined on the basis of the parameter representing the setpoint angular position or the parameter representing the angular position of the device or may be measured directly or indirectly on the motor or on the device.

In some embodiments, the second intermediate value is obtained in particular by calculating the difference between the parameter representing the setpoint speed and the parameter representing the speed of the device, then by multiplying the difference by a second gain. The second gain is subsequently referred to as the «derived gain».

In some embodiments, the second intermediate value is obtained by saturating the implementation of the product of the difference by the derived gain. Thus, there is no «overflow» of the second intermediate value, that is to say the second intermediate value is limited.

In some embodiments, the first determination step also determines the second intermediate value of the setpoint torque as a function of the speed of the vehicle.

More specifically, the derived gain may depend on the speed of the vehicle.

Thus, the derived gain modifies a speed with which the vehicle wheels will follow the setpoint angular position. At the vehicle level, this modifies a precision with which the driver can control a wheel orientation angle. By reducing the derived gain, this precision decreases but driving comfort is increased because it filters out higher frequency wheel orientation movements.

According to an embodiment, the derived gain increases with the vehicle speed.

Thus, at 20 km/h, the derived gain is reduced so as to degrade the precision of controlling the wheel orientation angle but to improve the driving comfort, for example in the case of rapid variations in the setpoint angular position, that is to say if the driver oscillates the steering wheel.

At high speed, for example 130 km/h, the rack ratio is not very direct, so it is important to maintain a good precision and therefore a high derived gain.

In some embodiments, the limit value of the second intermediate value of the setpoint torque is obtained in particular by calculating the difference between the parameter representing the setpoint speed and the parameter representing the speed, then by multiplying the difference by a second limit gain. The second limit gain is subsequently referred to as the «limit derived gain»>.

In some embodiments, the second determination step determines the limit value of the second intermediate value of the setpoint torque as a function of the vehicle speed.

More specifically, the limit derived gain may depend on the vehicle speed.

Another aspect of the invention concerns a vehicle comprising a power steering system of the type without mechanical link implementing a securing method according to the invention.

BRIEF DESCRIPTION OF THE DRAWINGS

The invention will be better understood, thanks to the following description, which relates to several embodiments according to the present invention, given as non-limiting examples and explained with reference to the appended schematic drawings, in which:

FIG. 1 is a schematic representation of a first embodiment of the invention;

FIG. 2 is a schematic representation of a first part of the first embodiment;

FIG. 3 is a schematic representation of a second part of the first embodiment;

FIG. 4 is a schematic representation of a second embodiment;

FIG. 5 is a schematic representation of a vehicle comprising a power steering system without mechanical link.

DESCRIPTION OF THE EMBODIMENTS

Only the elements necessary for understanding the invention have been shown.

The invention concerns a method 100, 200 for securing a setpoint torque for a pair of assistance motors 24, 24' of a power steering system 1 for a vehicle 2, and more particularly for a motor vehicle 2 intended for transporting people.

In a manner known per se, and as can be seen in FIG. 5, said power steering system 1 comprises a steering wheel 3 on which a driver can exert a force, called «steering wheel torque» T3. An angle θ3 of the steering wheel 3 is measured by an angle sensor 23.

The steering wheel torque T3 and the angle θ3 of the steering wheel are transmitted to an electronic rack control unit 20.

Said steering wheel 3 is not mechanically linked to a steering rack 6, which is itself guided in translation in a steering housing 7 fixed to said vehicle 2. In other words, the steering wheel 3 is mechanically detached from the steering rack 6. In this case, the steering system 1 comprises a steering wheel unit mechanically independent of a rack unit. In other words, a force applied T3 on the steering wheel unit is not mechanically transmitted to the rack unit, and vice versa. The power steering system 1 is of the «without mechanical link» or «steer-by-wire» type.

The steering wheel unit comprises said steering wheel 3 and at least one electronic steering wheel control unit, not shown, which determines in particular a torque to be felt by the driver during a maneuver of the steering wheel 3, hereinafter called the setpoint control torque. The setpoint control torque is intended in particular to make the driver feel torque information consistent with a life situation in which the vehicle 2 is located (turn, straight line, level of grip, condition of the surface, etc.). The electronic steering wheel control unit controls the steering wheel torque T3 to the setpoint control torque by means of a control motor, not shown. The control motor then exerts a control motor torque so that the steering wheel torque T3 is close to or equal to the setpoint control torque.

In certain embodiments, the securing method 100, 200 according to the invention can be exerted on the control motor.

The rack unit comprises said rack 6 and at least the electronic rack control unit 20 which in particular controls an angular position $P_c$ of the rack 6 so that it is consistent with a setpoint angular position $P_{tg}$. The setpoint angular position $P_{tg}$ is generally consistent with the steering wheel angle θ3, but it can be modified by functions of the vehicle 2 such as a trajectory tracking function or a parking assistance function of the vehicle 2.

The electronic rack control unit 20 determines a setpoint motor torque, or setpoint torque in the remainder of the description, making it possible to control the pair of assistance motors 24, 24' exerting a motor torque T12, T12' on the rack 6. In other words, the electronic rack control unit 20 servo-controls the angular position $P_c$ of the rack 6 to the setpoint angular position $P_{tg}$ by determining the setpoint torque of the pair of motors 24, 24'.

The angular position $P_c$ of the rack 6 can be deduced from an angular position θ12, θ12' of each motor 24, 24'.

Preferably, the ends of the rack 6 are each connected to a steering rod 8, 9 connected to the steering knuckle of a steered wheel 10, 11 (respectively a left wheel 10 and a right wheel 11), such that the longitudinal translational movement of the rack 6 makes it possible to modify a steering angle (yaw angle) of the steered wheels 10, 11. The steered wheels 10, 11 may also preferably be drive wheels.

Each assistance motor 24, 24' will preferably be an electric motor, with two directions of operation, and preferably a rotary electric motor, of the brushless type.

Each assistance motor 24, 24' can be engaged directly on the steering rack 6, for example by means of a pinion 13, 13'.

A distribution of the setpoint torque $C_{tgs}$ on each of the motors 24, 24' is carried out for example according to the availability of each of the motors.

In the remainder of the description, reference will be made to only one motor 24 of the pair of motors. However, it is clear that the invention can also be applied to the other motor 24'.

FIGS. 1, 2 and 3 illustrate a first embodiment 100, while FIG. 4 illustrates a second embodiment 200 of the method according to the invention. However, to facilitate reading of the drawings, the same elements bear the same references from one figure to another.

The invention relates more specifically to the method 100, 200 for securing the setpoint torque for the motor 24. As described above, said motor 24 exerts the motor torque T12 on the rack 6 of the power steering system 1 of the vehicle 2 so as to modify the angular position $P_c$ of the rack. The method 100, 200 is executed by the electronic rack control unit 20 and comprises a first determination step ED1 in which a first intermediate value $C_{kp}$ of the setpoint torque is determined as a function of at least one parameter representative of a target angular position $P_{tg}$ of the rack 6 and of at least one parameter representative of the angular position $P_c$ of the rack 6.

The setpoint torque designates any quantity representative of the setpoint torque making it possible to control the torque of the motor 24.

The parameter representative of the target angular position $P_{tg}$ or the parameter representative of the angular position $P_g$ may be an angle, a position of the rack relative to a point of the motor 24, or an angular position θ12 of the motor 24. The parameter representative of the angular position $P_g$ may be determined, estimated or measured.

In each of the embodiments illustrated in the figures, the first intermediate value $C_{kp}$ is obtained in particular by calculating the difference of the parameter representing the setpoint angular position $P_{tg}$ and the parameter representing the angular position $P_g$, then by multiplying the difference by a first gain $K_p$. The first gain $K_p$ is subsequently referred to as the «proportional gain». Then the first intermediate value $C_{kp}$ is obtained by an implementation saturation Sat of the product of the difference by the proportional gain $K_p$. Thus, there is no «overflow» of the first intermediate value $C_{kp}$, that is to say the first intermediate value $C_{kp}$ is limited.

The first determination step ED1 also determines the first intermediate value $C_{kp}$ of the setpoint torque as a function of the speed V of the vehicle 2.

More specifically, the proportional gain $K_p$ depends on the speed V of the vehicle 2. Thus, the proportional gain $K_p$ modifies a speed with which the wheels of the vehicle will follow the setpoint angular position. At the vehicle level, this changes the precision with which the driver can control a wheel orientation angle. By reducing the proportional gain $K_p$, this precision decreases but a driving comfort is increased because it filters out higher frequency wheel orientation movements.

Vehicles are often equipped with a rack with a variable ratio depending on the vehicle speed V between the setpoint angular position and the wheel orientation angle. In other words, at 20 km/h, the rack ratio is substantially direct, that is to say the wheel orientation angle varies substantially proportionally to the setpoint angular position, because the vehicle's trajectory evolves slowly. At high speed, the rack ratio is not very direct, that is to say the wheel orientation angle varies less than the setpoint angular position $P_{tg}$, because the slightest variation in the wheel orientation angle causes the car to deviate/shake significantly.

According to an embodiment, the proportional gain $K_p$ increases with the vehicle 2 speed V.

Thus, at 20 km/h, the proportional gain $K_p$ is reduced so as to degrade the precision of the steering of the wheel orientation angle but to improve driving comfort, for example in the case of rapid variations in the setpoint angular position, that is to say if the driver oscillates the steering wheel.

At high speed, for example 130 km/h, the rack ratio is not very direct, it is therefore important to maintain good precision and therefore a high proportional gain $K_p$.

The first determination step ED1 also determines a second intermediate value $C_{kd}$ of the setpoint torque as a function of at least one parameter representative of a setpoint speed $V_{ctg}$ of the rack 6 and a parameter representative of a speed $V_c$ of the rack 6.

The parameter representative of the setpoint speed $V_{ctg}$ of the rack or the parameter representative of the speed $V_c$ of the rack can be determined on the basis of the parameter representative of the setpoint angular position $P_{tg}$ or of the parameter representative of the angular position $P_c$ of the rack or be measured directly or indirectly on the motor 24 or on the rack.

The second intermediate value $C_{kd}$ is obtained in particular by calculating the difference between the parameter representative of the setpoint speed $V_{ctg}$ and the parameter representative of the speed $V_c$ of the rack, then by multiplying the difference by a second gain $K_d$. The second gain $K_d$ is subsequently referred to as the «derived gain».

The second intermediate value $C_{kd}$ is obtained by an implementation saturation Sat of the product of the difference by the derived gain $K_d$. Thus, there is no «overflow» of the second intermediate value, that is to say the second intermediate value $C_{kd}$ is limited.

The first determination step ED1 determines the second intermediate value $C_{kd}$ of the setpoint torque also according to the speed V of the vehicle 2.

More specifically, the derived gain $K_d$ can depend on the speed V of the vehicle 2. Thus, the derived gain $K_d$ modifies a speed with which the vehicle wheels will follow the target angular position. At the level of the vehicle 2, this modifies a precision with which the driver can control a wheel orientation angle. By decreasing the derived gain $K_d$, this precision decreases but driving comfort is increased because it filters out higher frequency wheel orientation movements.

According to one embodiment, the derived gain $K_d$ increases with the vehicle 2 speed V.

Thus, at 20 km/h, the derived gain $K_d$ is reduced so as to degrade the precision of the steering of the wheel orientation angle but to improve the driving comfort, for example in the case of rapid variations in the setpoint angular position, that is to say if the driver oscillates the steering wheel.

At high speed, for example 130 km/h, the rack ratio is not very direct, it is therefore important to maintain good precision and therefore a high derived gain $K_d$.

The method 100, 200 comprises a second determination step ED2 in which a limit value $B_{kpl}$, $B_{kpu}$ of the first intermediate value $C_{kp}$ of the setpoint torque is determined as a function of the parameter representative of the setpoint angular position $P_{tg}$ and the parameter representative of the angular position $P_c$.

The limit value $B_{kpl}$, $B_{kpu}$ is obtained in particular by calculating the difference between the parameter representing the setpoint angular position $P_{tg}$ and the parameter representing the angular position $P_c$, then by multiplying the difference by a first limit gain $B_{kp}$. The first limit gain $B_{kp}$ is subsequently referred to as the «limit proportional gain».

The limit value $B_{kpl}$, $B_{kpu}$ may be a pair of limit values comprising an upper limit value $B_{kpu}$ and a lower limit value $B_{kpl}$. Alternatively, only one of the upper limit value $B_{kpu}$ or the lower limit value $B_{kpl}$ can be determined, and the other of the upper limit value $B_{kpu}$ or lower limit value $B_{kpl}$ is calculated by symmetry.

The second determination step ED2 determines the limit value $B_{kpl}$, $B_{kpu}$ of the first intermediate value $C_{kp}$ of the setpoint torque as a function of the vehicle 2 speed V. More specifically, the limit proportional gain $B_{kp}$ can depend on the vehicle 2 speed V.

The second determination step ED2 also determines a limit value $B_{kdl}$, $B_{kdu}$ of the second intermediate value $C_{kd}$ of the setpoint torque as a function of the parameter representing the setpoint speed $V_{ctg}$ and the parameter representing the speed $V_c$ of the rack 6.

The limit value $B_{kdl}$, $B_{kdu}$ of the second intermediate value $C_{kd}$ of the setpoint torque is obtained in particular by calculating the difference between the parameter representing the setpoint speed $V_{ctg}$ and the parameter representing the speed $V_c$, then by multiplying the difference by a second limit gain $B_{kd}$. The second limit gain $B_{kd}$ is subsequently referred to as the «limit derived gain».

The second determination step ED2 determines the limit value $B_{kdl}$, $B_{kdu}$ of the second intermediate value $C_{kd}$ of the setpoint torque as a function of the vehicle 2 speed V. More specifically, the limit derived gain $B_{kd}$ may depend on the vehicle 2 speed V.

The method comprises a third determination step ED3 in which a parameter representing the average motor torque exerted at a previous instant $P_{fc}$, $P_{fi}$ is determined.

A previous instant is understood to mean a moment in the past relative to the calculation of a target value $C_{tgs}$ of the current setpoint torque. The previous instant depends in particular on a speed of implementation of the securing method 100, 200. A use of the parameter representing the average motor torque $P_{fc}$, $P_{fi}$ makes it possible not to take into account rapid changes in the motor torque T12.

FIGS. 2 and 4 illustrate a first embodiment in which the parameter representing the average motor torque exerted at a previous instant $P_{fi}$ is determined as a function of the parameter representing the setpoint angular position $P_{tg}$ and the parameter representing the angular position $P_c$ of the rack.

The parameter representing the average motor torque $P_{fi}$ is obtained in particular by calculating the difference between the parameter representing the setpoint angular position $P_{tg}$ and the parameter representing the angular position $P_c$, then by multiplying the difference by a gain $K_i$ designated, subsequently, by the terms «integral gain».

The parameter representing the average motor torque $P_{fi}$ is obtained by an implementation saturation Sat and an integration Int of the product of the difference by the integral gain $K_i$. Thus, there is no «overflow» of the parameter representative of the average motor torque $P_{fi}$, that is to say that the parameter representative of the average motor torque $P_{fi}$ is limited.

In certain embodiments, the parameter representative of the average motor torque $P_{fi}$ is determined as a function of the vehicle 2 speed V. More specifically, the integral gain $K_i$ can depend on the vehicle 2 speed V.

FIG. 3 illustrates a second embodiment in which the parameter representative of the average motor torque exerted at the previous instant Pic is determined as a function of the target value of the setpoint torque at the previous instant or as a function of a measurement of a parameter representative of the motor torque exerted at the previous instant $C_{mot}$ carried out directly or indirectly on the rack 6 or on the motor 24.

More precisely, the parameter representative of the average motor torque exerted at the previous instant $P_{fc}$ is determined by applying a low-pass filter Moy to the target value of the setpoint torque at the previous instant or to the measurement of the parameter representative of the motor torque exerted at the previous instant $C_{mot}$. For example, the low-pass filter Moy is of the $2^{nd}$ order.

Thus, a static part of the motor torque exerted T12 is obtained, that is to say rapid variations in the exerted motor torque are eliminated. The low-pass filter Moy makes it possible to obtain a sort of «average» motor torque.

The parameter representing the average motor torque exerted at the previous instant $P_{fc}$ is obtained by multiplying the filtered target value of the setpoint torque at the previous instant or the filtered measurement of the parameter representing the motor torque exerted at the previous instant $C_{mot}$, with a gain $K_s$ subsequently referred to as «static gain». The static gain $K_s$ depends on the vehicle 2 speed V.

Finally, the method 100, 200 comprises a securing step ES in which the target value $C_{tgs}$ of the setpoint torque is determined as a function of the first intermediate value $C_{kp}$ of the setpoint torque, of the second intermediate value $C_{kd}$ of the setpoint torque, of the limit value $B_{kpl}$, $B_{kpu}$ of the first intermediate value $C_{kp}$ of the setpoint torque, of the limit value $B_{kdl}$, $B_{kdu}$ of the second intermediate value $C_{kd}$ of the setpoint torque and of the parameter representing the average motor torque exerted at the previous instant $P_{fi}$, $P_{fc}$.

The target value $C_{tgs}$ of the setpoint torque is the torque value that the motor 24 is desired to exert on the rack. This is a secured setpoint torque. In other words, the securing step ES makes it possible to guarantee that the requested setpoint torque, corresponding to the target value $C_{tgs}$ of the setpoint torque, is comprised in a defined interval around the parameter representing the average motor torque exerted at a previous instant $P_{fi}$, $P_c$. There can therefore be no significant and sudden deviation from the requested setpoint torque. Thus, errors related to a malfunction of the controller implementing at least the first step are avoided.

In the embodiment illustrated in FIGS. 1, 2 and 3, the method 100 comprises a first evaluation step EE1 in which a temporary value $C_{tg}$ of the setpoint torque is evaluated as a function of the first intermediate value $C_{kp}$ of the setpoint torque, the second intermediate value $C_{kd}$ of the setpoint torque and the parameter representing the average motor torque exerted at the previous instant $P_{fi}$. The first evaluation step EE1 sums the first intermediate value $C_{kp}$ of the setpoint torque, the second intermediate value $C_{kd}$ of the setpoint torque and the parameter representing the average motor torque exerted at the previous instant $P_{fi}$.

The method also comprises a second evaluation step EE2 in which a limit value $B_u$, $B_l$ of the temporary value $C_{tg}$ of the setpoint torque is determined as a function of the limit value $B_{kpl}$, $B_{kpu}$ of the first intermediate value $C_{kp}$ of the setpoint torque, of the limit value $B_{kdl}$, $B_{kdu}$ of the second intermediate value $C_{kd}$ of the setpoint torque and of the parameter representing the average motor torque exerted at the previous instant $P_{fc}$. More particularly, the second evaluation step EE2 sums the limit value $B_{kpl}$, $B_{kpu}$ of the first intermediate value $C_{kp}$ of the setpoint torque, the limit value $B_{kdl}$, $B_{kdu}$ of the second intermediate value $C_{kd}$ of the setpoint torque and the parameter representing the average motor torque exerted at the previous instant $P_{fc}$.

The securing step determines the target value $C_{tgs}$ of the setpoint torque as a function of the temporary value $C_{tg}$ of the setpoint torque and of the limit value $B_u$, $B_l$ of the temporary value $C_{tg}$ of the setpoint torque. More precisely, the securing step then performs a limitation of the temporary value of the setpoint torque by the limit value of the temporary value of the setpoint torque so that the temporary value of the setpoint torque is comprised in the limit value of the temporary value.

The embodiment illustrated in FIGS. 1, 2 and 3 allows the first determination step ED1, the third determination step ED3 and the first evaluation step EE1 to be performed by a controller in the AFC position of the rack, and the second determination step ED2, the third determination step ED3, the second evaluation step EE2 and the securing step ES to be performed by a securing controller AFS receiving in particular as input the temporary value $C_{tg}$ of the setpoint torque from the controller in the AFC position. Thus the securing controller AFS is positioned independently and after the controller in the AFC position. It is therefore possible on the one hand to make modifications or adjustments to the AFC position controller independently of the securing controller AFS and on the other hand to position the securing controller AFS in a partition of an electronic control unit that is more robust to failures than that of the position controller AFC. Securing the setpoint torque of the motor is therefore ensured.

In the embodiment illustrated in FIG. 4, the method 200 comprises a first securing step ES1 in which a target value $C_{kps}$ of the first intermediate value $C_{kp}$ of the setpoint torque is determined as a function of the first intermediate value $C_{kp}$ of the setpoint torque and the limit value $B_{kpl}$, $B_{kpu}$ of the first intermediate value $C_{kp}$ of the setpoint torque, and a target value $C_{kds}$ of the second intermediate value $C_{kd}$ of the setpoint torque is determined as a function of the second intermediate value $C_{kd}$ of the setpoint torque and the limit value $B_{kdl}$, $B_{kdu}$ of the second intermediate value $C_{kd}$ of the setpoint torque.

The first securing step ES1 consists more precisely of a limitation of the first intermediate value $C_{kp}$ of the setpoint torque by the limit value $B_{kpl}$, $B_{kpu}$ of the first intermediate value $C_{kp}$ of the setpoint torque, and of a limitation of the second intermediate value $C_{kd}$ of the setpoint torque by the limit value $B_{kdl}$, $B_{kdu}$ of the second intermediate value $C_{kd}$ of the setpoint torque. Thus the target value $C_{kps}$ of the first intermediate value $C_{kp}$ of the setpoint torque is at most or at least equal to the limit value $B_{kpl}$, $B_{kpu}$ of the first intermediate value $C_{kp}$ of the setpoint torque, and the target value $C_{kds}$ of the second intermediate value $C_{kd}$ of the setpoint torque is at most or at least equal to the limit value $B_{kdl}$, $B_{kdu}$ of the second intermediate value $C_{kd}$ of the setpoint torque.

Then, the securing step ES determines the target value $C_{tgs}$ of the setpoint torque as a function of the target value $C_{kps}$ of the first intermediate value $C_{kp}$ of the setpoint torque, of the target value $C_{kds}$ of the second intermediate value $C_{kd}$ of the setpoint torque and of the parameter representative of the average motor torque exerted at the previous instant $P_{fi}$. For example, the target value $C_{tgs}$ of the setpoint torque is obtained by the sum of the target value $C_{kps}$ of the first intermediate value $C_{kp}$ of the setpoint torque, of the target value $C_{kds}$ of the second intermediate value $C_{kd}$ of the setpoint torque and of the parameter representative of the average motor torque exerted at the previous instant $P_{fi}$.

Although the present invention has been described with reference to specific embodiments, it is obvious that modifications and changes can be made to these examples without departing from the general scope of the invention as defined by the claims. In particular, individual features of the various illustrated/mentioned embodiments can be combined in additional embodiments. Therefore, the description and drawings should be considered in an illustrative rather than a restrictive sense.

It is also obvious that all features described with reference to a method are transposable, alone or in combination, to a device, and conversely, all features described with reference to a device are transposable, alone or in combination, to a method.

The invention claimed is:

1. A method for securing a setpoint torque for a motor, said motor exerting a motor torque on a device of a power steering system of a vehicle so as to modify an angular position of said device, the method being executed by at least one controller and comprising:

A first determination step in which at least one first intermediate value of the setpoint torque is determined as a function of at least one parameter representing a setpoint angular position of the device and of at least one parameter representative of the angular position of the device;

A second determination step in which a limit value of the at least one first intermediate value of the setpoint torque is determined as a function of at least the parameter representing the setpoint angular position and at least the parameter representing the angular position;

A third determination step in which a parameter representing the average motor torque exerted at a previous instant is determined;

A first evaluation step in which a temporary value of the setpoint torque is evaluated as a function of the at least one first intermediate value of the setpoint torque and of the parameter representing the average motor torque exerted at the previous instant;

A second evaluation step in which a limit value of the temporary value of the setpoint torque is determined as a function of the limit value of the at least one first intermediate value of the setpoint torque and of the parameter representing the average motor torque exerted at the previous instant;

A securing step in which a target value of the setpoint torque is determined as a function of at least the temporary value of the setpoint torque and the limit value of the temporary value of the setpoint torque.

2. The securing method according to claim 1, wherein the parameter representing the average motor torque exerted at the previous instant is determined as a function of at least the parameter representing the setpoint angular position and at least the parameter representing the angular position of the device.

3. The securing method according to claim 1, wherein the parameter representing the average motor torque exerted at the previous instant is determined as a function of the target value of the setpoint torque at the previous instant or as a function of a measurement of a parameter representing the exerted motor torque at the previous instant.

4. The securing method according to claim 3, wherein the parameter representing the average motor torque exerted at the previous instant is determined by applying a low-pass filter to the target value of the setpoint torque at the previous instant or to the measurement of the parameter representing the motor torque exerted at the previous instant.

5. The securing method according to claim 1, wherein the first determination step determines the at least one first intermediate value of the setpoint torque also as a function of the speed of the vehicle.

6. The securing method according to claim 1, wherein the second determination step determines the limit value of the at least one first intermediate value of the setpoint torque as a function of the speed of the vehicle.

7. The securing method according to claim 1, wherein the first determination step, the third determination step and the first evaluation step are carried out by a position controller of the device, and the second determination step, the third determination step, the second evaluation step and the securing step are carried out by a securing controller receiving in particular as input the temporary value of the setpoint torque from the position controller.

8. The securing method according to claim 1, wherein the first determination step also determines a second intermediate value of the setpoint torque as a function of at least one parameter representative of a setpoint speed of said device and a parameter representative of a speed of said device, and the second determination step also determines a limit value of the second intermediate value of the setpoint torque as a function of at least the parameter representative of the setpoint speed of said device and the parameter representative of the speed of said device.

9. A vehicle comprising a power steering system of the type without mechanical link implementing a securing method according to claim 1.

* * * * *